(12) United States Patent
Olson et al.

(10) Patent No.: US 9,124,568 B2
(45) Date of Patent: Sep. 1, 2015

(54) DEVICE AND METHOD FOR ASSET PROTECTION SCHEME

(71) Applicant: Disney Enterprises, Inc., Burbank, CA (US)

(72) Inventors: Peter Olson, Burbank, CA (US); Paul Degnan, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 98 days.

(21) Appl. No.: 13/834,615

(22) Filed: Mar. 15, 2013

(65) Prior Publication Data

US 2014/0283134 A1    Sep. 18, 2014

(51) Int. Cl.
*G06F 21/00*    (2013.01)
*H04L 29/06*    (2006.01)
*G06F 21/10*    (2013.01)

(52) U.S. Cl.
CPC ............... *H04L 63/08* (2013.01); *G06F 21/10* (2013.01); *H04L 63/062* (2013.01); *G06F 2221/0784* (2013.01)

(58) Field of Classification Search
USPC ..................................... 726/27–30
See application file for complete search history.

(56) References Cited

U.S. PATENT DOCUMENTS

| | | | |
|---|---|---|---|
| 7,546,334 B2 * | 6/2009 | Redlich et al. | ............... 709/201 |
| 7,929,560 B2 | 4/2011 | Morioka | |
| 8,176,563 B2 | 5/2012 | Redlich et al. | |
| 8,219,635 B2 | 7/2012 | Ganesan et al. | |
| 8,224,705 B2 | 7/2012 | Moskowitz | |
| 2007/0079352 A1 | 4/2007 | Klein, Jr. | |
| 2007/0106810 A1 | 5/2007 | Ryman | |
| 2007/0204078 A1 | 8/2007 | Boccon-Gibod et al. | |
| 2008/0119953 A1 | 5/2008 | Reed et al. | |
| 2008/0172718 A1 | 7/2008 | Bradley | |
| 2008/0256254 A1 * | 10/2008 | Kim et al. | ................ 709/231 |
| 2008/0282298 A1 | 11/2008 | Ganesan et al. | |
| 2011/0246616 A1 | 10/2011 | Ronca et al. | |
| 2012/0254370 A1 * | 10/2012 | Bacher et al. | ................ 709/219 |
| 2012/0284802 A1 | 11/2012 | Hierro et al. | |

OTHER PUBLICATIONS

Xiao Zhang,"*A Survey of Digital Rights Management Technologies*", Nov. 28, 2011 http://www.cse.wustl.edu/~jain/cse571-11/ftp/drm/index.html, , 10 pps.

* cited by examiner

*Primary Examiner* — Ghazal Shehni
(74) *Attorney, Agent, or Firm* — Fay Kaplun & Marcin, LLP (57) ABSTRACT

A device and method for an asset protection scheme includes receiving, by a data chunk serving server, a first request for an asset from a client device; transmitting, by the data chunk serving server, a plurality of data chunks to the client device, each of the data chunks corresponding to a portion of the asset; receiving, by a key serving server, a second request for key data from the client device, the key data corresponding to data removed from the asset to create the plurality of data chunks, wherein the plurality of data chunks and the key data correspond to an entirety of the asset; and transmitting, by the key serving server, the key data to the client device.

23 Claims, 4 Drawing Sheets

DEVICE AND METHOD FOR ASSET PROTECTION SCHEME

BACKGROUND INFORMATION

A web application works via a client-server interaction in which assets such as static images, video, or other files are stored on a remote database and delivered to the client (e.g., a web browser) over a network via progressive download using Hypertext Transfer Protocol (HTTP). Accordingly, the asset is provided to the user on a one-time basis upon request. A conventional web application utilizes known techniques by which assets are secured on the remote server to prevent unauthorized access and download. For example, the assets may be encrypted such that the asset is required to be decrypted for the web application to access the asset. There are also complementary methods for preventing access to the asset within the web client. For example, the web application may include an authentication of the user for the asset to be accessed. However, there are instances when even authorized users for a particular asset have abused the authorization and intercepted the asset during the download process.

Conventional Digital Rights Management (DRM) systems have been employed to protect high-value assets, but these systems often require additional costs or performance overheads that make them undesirable to deploy on lighter-weight web applications. As a consequence, when applied to lightweight web applications, a slow and relatively unresponsive functionality results. The encryption process for the asset may require excessive processing power which in turn also adds excessive overhead to the process. Thus, the server-side is forced to provide these services and absorb the costs/overheads. The client-side may also be required to include a corresponding system to decrypt the encoded asset. Thus, the client-side may require additional time to properly receive the asset, thereby reducing an efficiency of the asset receiving process. In addition, the conventional DRM systems are often not compatible with common web application programming libraries which often require further investment in engineering resources and degradation of user experience. Furthermore, the conventional DRM systems can involve costly licensing or other fees which add to the total cost of delivering the assets.

Accordingly, there is a need for a simple asset protection method for light weight implementations which is integrated with common client/server web applications using common web programming languages (e.g., JavaScript), is minimally impactful on the consumer experience of web applications including the memory and processing overhead and responsiveness of the user-facing components of the applications, does not require expensive licensing, and protects against asset interception during HTTP delivery.

DETAILED DESCRIPTION

The present invention relates to a device and method for an asset protection scheme. The method comprises receiving, by a data chunk serving server, a first request for an asset from a client device; transmitting, by the data chunk serving server, a plurality of data chunks to the client device, each of the data chunks corresponding to a portion of the asset; receiving, by a key serving server, a second request for key data from the client device, the key data corresponding to data removed from the asset to create the plurality of data chunks, wherein the plurality of data chunks and the key data correspond to an entirety of the asset; and transmitting, by the key serving server, the key data to the client device.

The exemplary embodiments may be further understood with reference to the following description of the exemplary embodiments and the related appended drawings, wherein like elements are provided with the same reference numerals. The exemplary embodiments are related to a device and method for delivering an asset from a server to a client using an asset protection scheme performed on the server-side. Specifically, the asset is separated by the server into chunks and keys such that the client transmits a first request for the asset to receive the chunks and transmits a second request for the key to receive the keys, thereby being able to reassemble the asset from having both the chunks and the keys. The server, the client, the asset, the asset protection scheme, the chunks, the keys, a related method for separating the assets into chunks and keys and a related method for delivering the asset will be explained in further detail below.

Figure 1A:
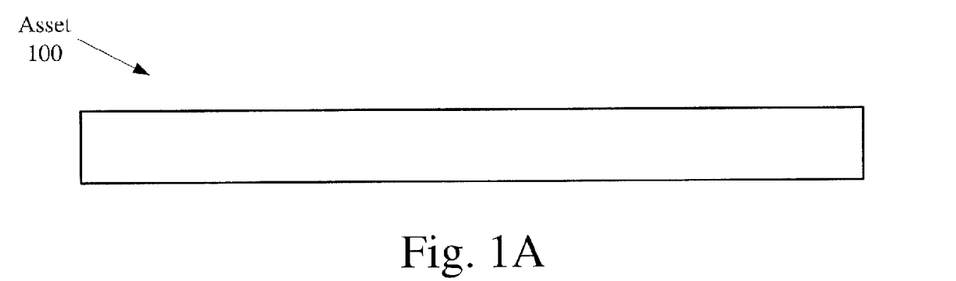
FIGS. 1A-C show an asset being separated into chunks and keys according to the exemplary embodiments.
Figure 1B:
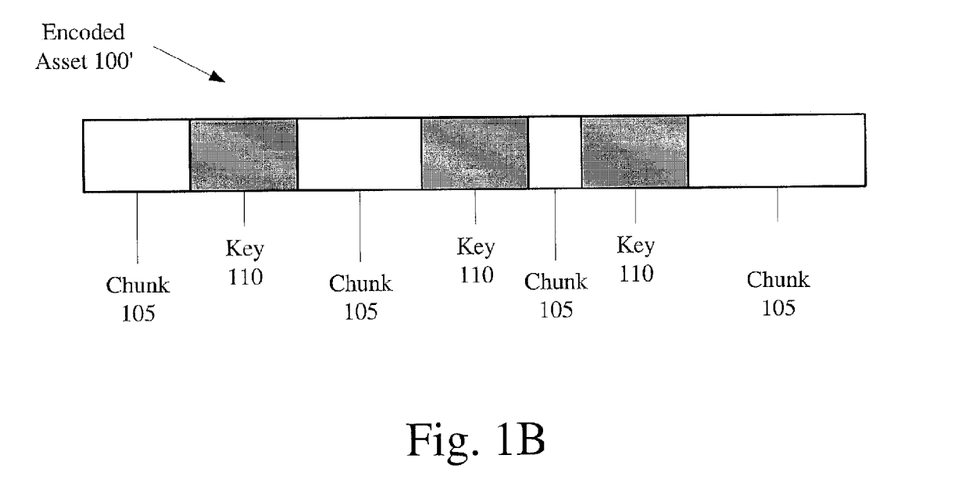
Figure 1C:
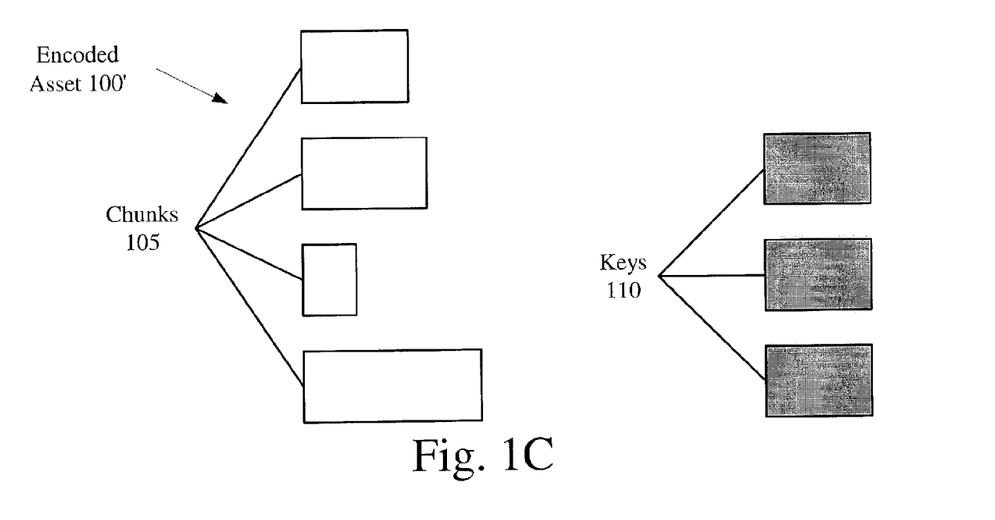

FIGS. 1A-C show an asset 100 being separated into chunks 105 and keys 110 according to the exemplary embodiments. FIG. 1A illustrates a constructive format for the asset 100 prior to being encoded and separated. The asset 100 may be any data that is transmitted via a client-server application from a remote database or other storage mechanism associated with the server to the client. For example, the asset 100 may be static image data, a video stream, etc. Accordingly, the asset 100 may be in a corresponding format. That is, the constructive format shown in FIG. 1A may be the format for the asset 100. The asset 100 may be stored in the remote database associated with the server until a request is received for a transmission thereof. It should be noted that the use of the remote database is only exemplary. The asset 100 may be stored in any storage arrangement. For example, the asset 100 may be stored in the remote database, a local database, a file system such as a local storage context of a browser or application, etc. Those skilled in the art will understand that the remote database used herein is representative of any type of storage arrangement.

It should be noted that the exemplary embodiments being utilized for the above described static image data is only exemplary. As described herein, the entire asset 100 may be received prior to displaying an image to the user. However, the asset 100 may also be received in a streaming manner. That is, a portion of the asset 100 may be received and assembled (as will be described below) prior to the entire asset 100 being received. Each of the portions of the asset 100 may be received and assembled until all the portions are received for the entire asset 100 to be assembled. It should also be noted that when the portions of the asset 100 are received and assembled, each portion may also be displayed in the streaming manner. Those skilled in the art will understand that the manner in which the asset 100 is transmitted may also be utilized in this streaming functionality.

FIG. 1B illustrates the asset 100 as an encoded asset 100'. The asset 100 has been translated as the encoded asset 100' using any known data-encoding format. For example, the data-encoding format may be Base64. For illustrative purposes, a simplified data-encoding format that may be used is to encode each pixel of the asset 100 that is static image data.

The asset 100 may be translated as the static image data using a variety of manners. In a first example, an image may be scanned and stored as the static image data. In another example, an image may be constructed using an image application and stored as the static image data. Accordingly, the static image data may include a plurality of pixels. Each pixel may represent a color or shade in which a corresponding string of letters or numbers may be used to represent the color or shade. Therefore, the asset 100 may be translated into the encoded asset 100' as a combined string for every pixel of the static image data. However, it should be noted that any data-encoding format may be used to translate the asset 100 into the encoded asset 100'. The encoded asset 100' may also be stored in the remote database associated with the server.

FIG. 1B also illustrates the encoded asset 100' separated into the chunks 105 and the keys 110. The server may determine the key 110 to be used for the separation of the encoded asset 100'. In the above described exemplary embodiment of a combined string, the server may determine a particular string of letters/numbers to represent the key 110. That is, the exemplary key 110 is a string of letters/numbers that are already present within the encoded asset 100'. For example, the key 110 may consist of a number of randomly selected characters within the encoding character space of the string of the encoded asset 100'. The randomly selected characters may also be consecutive characters. The server may determine the key 110 using a variety of factors. In a preferred exemplary embodiment, the server determines the key 110 as a function of the number of chunks 105 that will be generated. That is, the number of chunks 105 must satisfy a predetermined range such as more than two (2) but fewer than one hundred (100). For example, the server may determine the key 110 if the number of chunks 105 that are created is eight (8). It should be noted that the predetermined range of the number of chunks 105 may be determined as a function of predetermined criteria such as size of the asset. For example, an asset that is 1 MB in size may optimally have eight (8) chunks; an asset that is 300 kB in size may optimally have four (4) chunks; etc. As shown in FIG. 1B, the key 110 has been determined and is shown to be present in three (3) instances along the encoded asset 100'. Accordingly, the encoded asset 100' may include four (4) chunks 105. Thus, when the keys 110 are located within the encoded asset 100' and not at an end thereof, there may be n number of keys 110 and n+1 number of chunks 105. However, it should be noted that when one of the keys 110 are located at only one of the ends of the string of the encoded asset 100', there may be n number of keys 110 and n number of chunks 105, while when two of the keys 110 are each located at both ends of the string of the encoded asset 100', there may be n number of keys 110 and n−1 number of chunks 105. Thus, the encoded asset 100' may be split into a variable number of chunks 105 at any point where the key 110 occurs of which instances of the key 110 are removed from the chunks 105.

It should be noted that the encoded asset 100' may include various permutations in which further possible number of keys 110 and chunks 105 are generated. In the example above where the keys 110 are all disposed between chunks 105, the order of the chunks 105 and the keys 110 may be chunk 105-key 110-chunk 105- . . . -key 110-chunk 105. The other examples above in which the keys 110 may be located prior to the first chunk or after the last chunk include a substantially similar pattern in which the chunks 105 and the keys 110 alternate. However, in a further example, the asset 100 may be translated into the encoded asset 100' such that two or more keys 110 exist consecutively. Accordingly, the order of the chunks 105 and the keys 110 may be . . . key 110-key 110-chunk 105-key 110-chunk 105 . . . ; . . . chunk 105-key 110-key 110-key 110-chunk 105 . . . ; etc. Those skilled in the art will understand that the exemplary embodiments encompass each and every permutation from which the chunks 105 and the keys 110 are generated as a function of the encoded asset 100'.

FIG. 1C illustrates the chunks 105 and the keys 110 separated from each other from the encoded asset 100'. As illustrated, the encoded asset 100' has been separated into four (4) chunks 105 and three (3) keys 110. The chunks 105 and the keys 110 may be stored in the remote database associated with the server. However, it should be noted that in some embodiments, only a single instance of the key 110 is stored since the key 110 may be disposed at various locations along the string of the encoded asset 100', but comprises the same content at each occurrence. According to a preferred exemplary embodiment, the chunks 105 are stored separately from the key 110.

Figure 2:
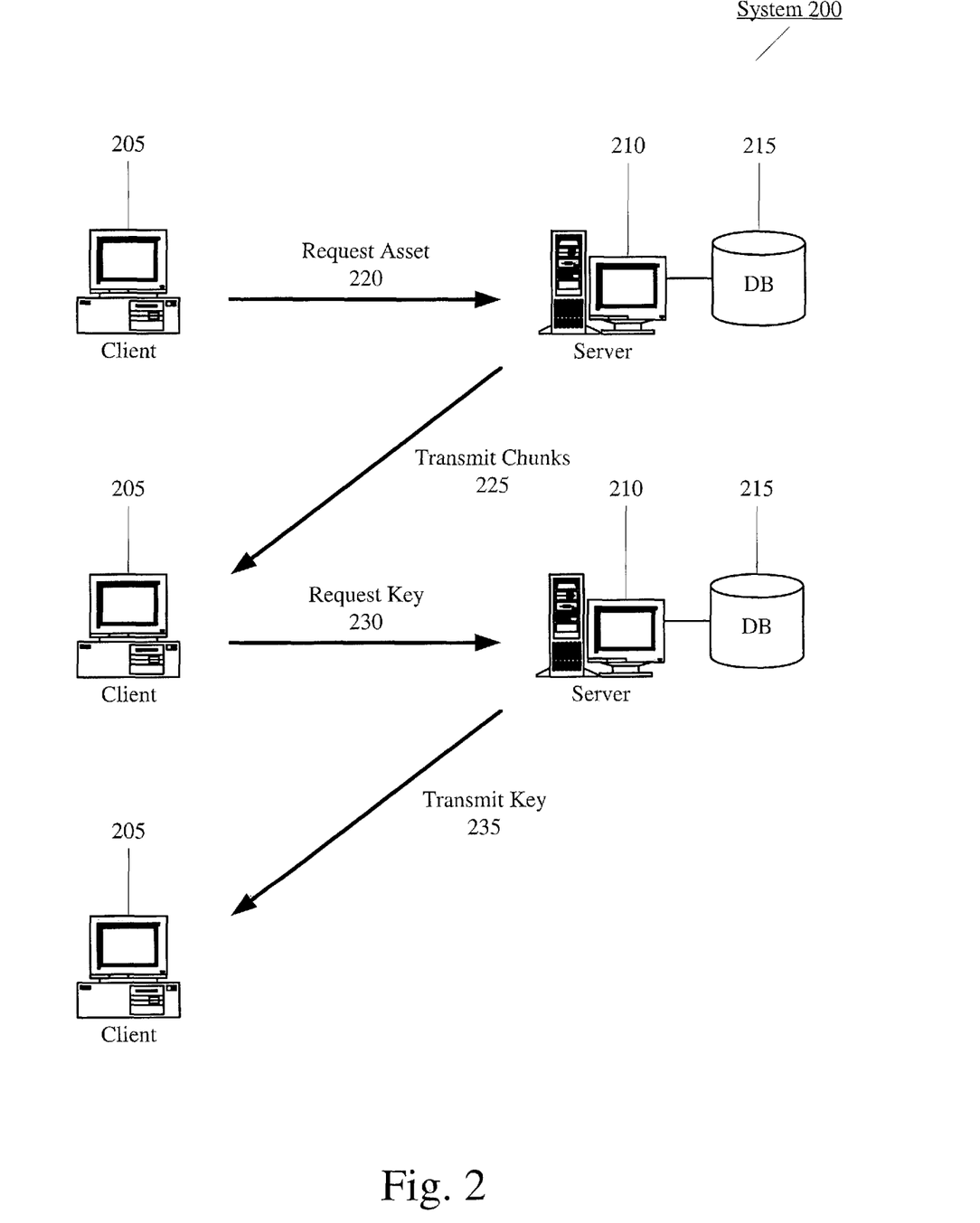
FIG. 2 shows a system for delivering an asset according to the exemplary embodiments.

FIG. 2 shows a system 200 for delivering the asset 100 according to the exemplary embodiments. The system 200 may include a client 205, a server 210, and a database 215. As discussed above, the system 200 relates to a client-server interaction in which the asset 100 is transmitted via an application executed on the client 205. Accordingly, the client 205 may be any electronic device configured to execute the client-server application. For example, the client 205 may be a stationary computer terminal, a mobile unit (e.g., a laptop, a smartphone, a tablet computer, etc.), etc. The client 205 and the server 210 may also be configured to communicate with one another via a network (not shown). Accordingly, the client 205 and the server 210 may include a transmitter, a receiver, a transceiver, etc. The network may be in any configuration. Thus, the client 205 and the server 210 may be configured to communicate via the network as a function of the protocol used therein. For example, if the network is a wireless network, both the client 205 and the server 210 may include a wireless transceiver. In another example, the client 205 and the server 210 may be hardwired to respective jacks that connect these components to the network.

Initially, a user of the client 205 may execute the client-server application thereon. Specifically, a processor of the client 205 may execute the client-server application which is stored in a memory arrangement thereof. The application may be used to request assets from the server 210/database 215. The application may be configured with an authentication feature. The user may be required to be an authorized user to request the assets. Thus, the authentication feature may request the user to provide access inputs such as a user login and associated password. The access inputs may be transmitted to the server 210 which stores the access inputs of a plurality of users in the database 215. If the access inputs are correct, the server 210 may indicate to the application that the user is authorized for the connection between the client 205 and the server 210 to be established. The connection between the client 205 and the server 210 may be established in perpetuity, for a single session, for a predetermined period of time, etc.

The user may select an asset 100 via the application that is available for transmission. For example, the application may provide a menu or graphical user interface from which the user may select the desired asset 100 using an input device (e.g., keyboard, mouse, touchscreen, etc.). Accordingly, the client 205 may transmit a request 220 for the asset 100 via the application. The server 210 may receive the request 220 for the asset 100. According to a first exemplary embodiment, the server 210 may have generated chunks 105 and keys 110 for each of the assets that are stored prior to receiving the request

220. Thus, the server 210 may determine the corresponding chunks 105 for the encoded asset 100' that represents the asset 100 that is requested. According to a second exemplary embodiment, the server 210 may determine the asset 100 that is requested and perform the above described manner of generating the chunks 105 and keys 110 with regard to FIG. 1 in an ad hoc manner. That is, the asset 100 is separated upon receiving the request. Upon receiving the request 220 for the asset 100, the server 210 may transmit 225 the chunks 105 of the asset 100 from the database 215.

Upon receiving the chunks 105, the client 205 may subsequently transmit a request 230 for the key 110 associated with the asset 100 that is requested. The server 210 may receive the request 230 for the key 110. The server 210 may transmit 235 the key 110 of the asset 100 from the database 215. Upon receiving the key 110, the application of the client 205 may reassemble the encoded asset 100' from the chunks 105 and the key 110 to generate the entire combined string representing the encoded asset 100'. The application may decode the encoded asset 100' to generate the asset 100.

It should be noted that the client-server application may be configured such that the asset 100 may be accessed only upon the entire data thereof being present. That is, the application may only be able to generate viewable data when the entire contents of the asset 100 are received. As discussed above, the asset 100 is translated as the encoded asset 100'. The chunks 105 and the key 110 relate to the encoded asset 100'. In the above described example, the encoded asset 100' may simply be a string of characters. The application may be incapable of creating the image, video, etc. from the encoded asset 100' until the entire data is received which includes both the chunks 105 and the key 110. For example, if only the chunks 105 are received, the application is unable to generate the asset 100 since there are missing strings from the entire combined string. When the application reassembles the chunks 105 with the keys 110 placed in the appropriate locations within the string, the application has the entire combined string and is capable of decoding the string to create the asset 100.

It should also be noted that the system 200 including a single server 210 and a single database 215 is only exemplary. According to another exemplary embodiment, there may be a first server configured to receive a request for the asset and transmit the chunks 105 and a second server configured to receive a request for the key and transmit the key 110. In a substantially similar manner, the first server may have access to a first remote database storing the chunks 105 while the second server may have access to a second remote database storing the key 110. As discussed above, there may be an authentication process for the application. That is, the user initially provides access inputs (e.g., login and password) to the first server to indicate that the user is authorized. The first server may thus be aware that the client 205 that is requesting the asset is allowed to transmit such a request and receive the chunks 105. However, even after receiving the chunks 105, the second server may still require the access inputs to be received to further verify that the user is still authorized to receive the key 110. This process may be performed automatically via the application or may be performed manually such that the user is again required to provide the access inputs. Once the second server also verifies the user is authorized, the key 110 may be sent for the requested asset.

It should further be noted that the chunks 105 and the key 110 may be stored in a variety of different manners. In a first example, to reduce processing requirements and also provide reduced loading profiles, the chunks 105 and the key 110 may be generated when the asset 100 is received by the server 210. Thereafter, the chunks 105 and the key 110 may be stored on a long term basis for every time the asset 100 is requested. In a second example, the chunks 105 and the key 110 may be generated and stored for a predetermined amount of time. For example, the chunks 105 and the key 110 for a particular asset 100 may be stored for one user in perpetuity, one day, several days, a week, several weeks, etc. Thus, when the asset 100 is requested, the chunks 105 and the key 110 is stored and ready for retrieval from the database 210. However, upon the time lapsing, the server 210 may generate and store a different set of chunks 105 and key 110 for the same asset 100. In a third example, the chunks 105 and the key 110 may be generated and stored temporarily for a particular session with the user. This relates to the server 210 creating the chunks 105 and key 110 in a dynamic manner. Thus, the chunks 105 and the key 110 are stored only for the time required for the asset 100 to be transmitted from the server 210 to the client 205.

Figure 3:
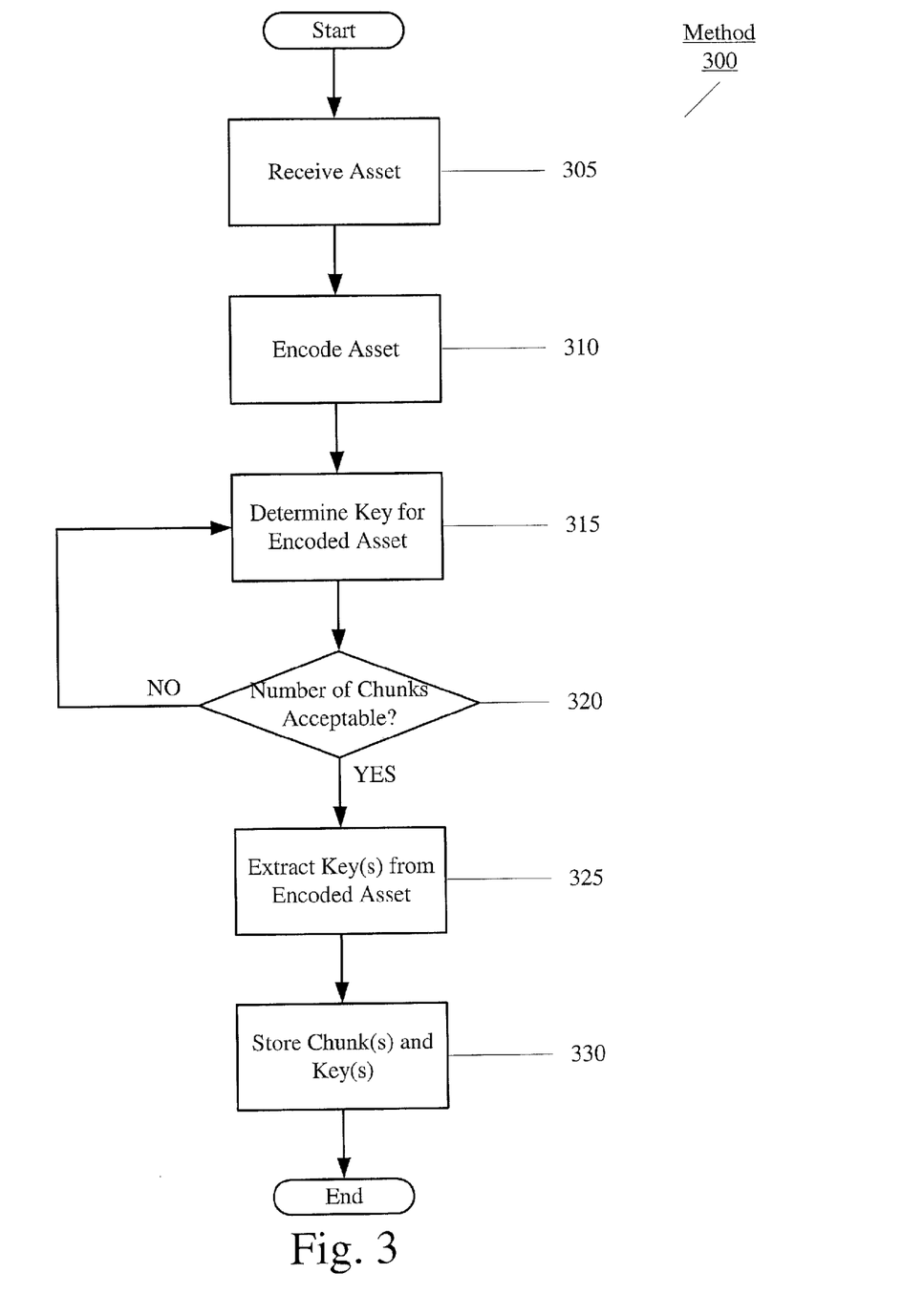
FIG. 3 shows a method for generating the chunks and keys for an asset according to the exemplary embodiments.

FIG. 3 shows a method 300 for generating the chunks 105 and keys 110 for the asset 100 according to the exemplary embodiments. The method 300 will be described with reference to the asset 100 and the encoded asset 100' of FIG. 1 and the server 210 and the database 215 of FIG. 2. It should be noted that the method 300 may be performed at a variety of different times. In a first example, the method 300 may be performed upon receiving an asset. In another example, the method 300 may be performed upon receiving a request for an asset. In yet another example, the method 300 may be performed upon receiving a plurality of assets associated with a set. The method 300 will be described below with regard to the first example. The method 300 will also be described below with regard to creating the chunks 105 and the keys 110 prior to the request for the asset 100 being received.

In step 305, the server 210 may receive the asset 100. As described above, the asset 100 may be received as data in a variety of different manners. In step 310, the server 210 encodes the asset 100. That is, the asset 100 is translated to generate the encoded asset 100'. As discussed above, the asset 100 may be translated into the encoded asset 100' using a variety of different manners and protocols. Thus, the asset 100 shown in FIG. 1A is translated into the encoded asset 100' as shown in FIG. 1B.

In step 315, the server 210 determines a first test key 110 for the encoded asset 100' as shown in FIG. 1B. As discussed above, the encoded asset 100' may be a string of characters. The key 110 may be a selected, consecutive set of characters within the combined string of the encoded asset 100'. In a preferred exemplary embodiment, the key 110 is present in at least a plurality of locations within the combined string of the encoded asset 100'. It should be noted that according to an exemplary embodiment, an initial selection of the key 110 may be selected by the server 210 in a pseudo-random manner. Specifically, the server 210 may include predetermined criteria to select the key 110. For example, a criterion that may be used is a number of characters. The server 210 may determine the key 110 having a predetermined number of characters that are consecutive within the encoded asset 100'. In another example, a criterion that may be used is a number of times the key 110 appears in the encoded asset 100'. In yet another example, a combination of the above noted criteria may be used.

In step 320, the server 210 determines whether the resulting chunks 105 created from selecting the key 110 is acceptable. For example, if the combined string of the encoded asset 100' is relatively short, the key 110 that is selected may encompass the entire combined string. In such a scenario, the entire combined string becomes the key 110 and no chunks 105 are created. Therefore, if the number of resulting chunks 105 is unacceptable, the method 300 returns to step 315 to determine another key 110 for the encoded asset 100'. Whether a key 110 is unacceptable may also have a predetermined number of criteria which may be substantially similar to the criteria for selecting the key 110. For example, the server 210 may determine that the key 110 is unacceptable if the resulting number of chunks 105 is too few or too many. This range of chunks 105 may be set by predetermined thresholds (e.g., minimum/maximum) as a function of further criteria such as the size of the asset 100. In another example, the server 210 may determine that the key 110 is unacceptable if the number of characters of the key 110 is below a minimum predetermined threshold number or exceeds a maximum predetermined threshold number.

The selection of a new test key 110 may utilize the above noted criteria. Thus, in an iteration of the determination of the key 110, the server 210 may again utilize the criterion for a number of characters. In a first example, the server 210 may use the same number of characters but select a different set of characters. In a second example, the server 210 may select a different number of characters. The server 210 may also utilize the criterion for the number of chunks 110. In a preferred exemplary embodiment, the number of resulting chunks 105 from the selection of the key 110 is eight (8) (e.g., when the asset is about 1 MB in size). When the method 300 returns to step 315, the server 210 may utilize results of a first attempt or multiple attempts to determine a proper selection of the key 110. For example, if multiple iterations for the selection of a key 110 have already been made based upon the criterion of using a single, predetermined number of characters of the key 110, the server 210 may determine that the number of characters of the key 110 must change. Thus, the server 210 may use a different number of characters to select the key 110 for the remainder of the method 300.

If the resulting number of chunks 105 is acceptable, the method 300 continues to step 325. In step 325, the server 210 extracts the keys 110 from the encoded asset 100'. Thus, the encoded asset 100' is separated into a plurality of chunks 105 and a plurality of keys 110 as shown in FIG. 1C. Accordingly, in step 330, the chunks 105 and the key 110 are stored in the database 215. As discussed above, a single instance of the key 110 is stored as the key 110 is the same at each occurrence within the encoded asset 100'.

It should be noted that the server 210 may further be configured to selectively utilize the key 110 in generating the chunks 105. For example, the server 210 may determine that an optimal number of chunks 105 for a particular asset is eight (8). However, the selected test key 110 generates sixteen (16) chunks 105. If the server 210 determines that the location of the key 110 within the encoded asset 100' allows for only half the keys 110 to be utilized, the server 210 may still select the key 110 as determined. Thus, eight (8) chunks 105 may still result from the selective use of the chosen key 110. In another example, the server 210 may utilize the key 110 such that only a portion of the encoded asset 100' generates the key/chunk disassembly. That is, a remainder of the encoded asset 100' may comprise a single chunk in which instances of the key 110 are not removed. In this manner, a select number of chunks 105 may still be generated.

It should also be noted that the use of a static key 110 is only exemplary. The exemplary embodiments may utilize a variety of schemes to generate or utilize the key 110. As described above, the key 110 may be static in which the key 110 is a common sequence of characters that are present within the encoded asset 100'. In another example, the server 210 and the client 205 may be configured to utilize a programmatic sequence of keys. That is, the server 210 may generate a first key 110 (e.g., "ab") and the programmatic sequence may determine subsequent keys for the encoded asset 100' (e.g., "cd," "ef," etc.). In this manner, the encoded asset 100' may be separated into chunks 105 and keys 110. Since the server 210 and the client 205 are both configured with the programmatic sequence, the server 210 need only transmit the first key (e.g., "ab") such that the client 205 is able to generate the subsequent keys.

Figure 4:
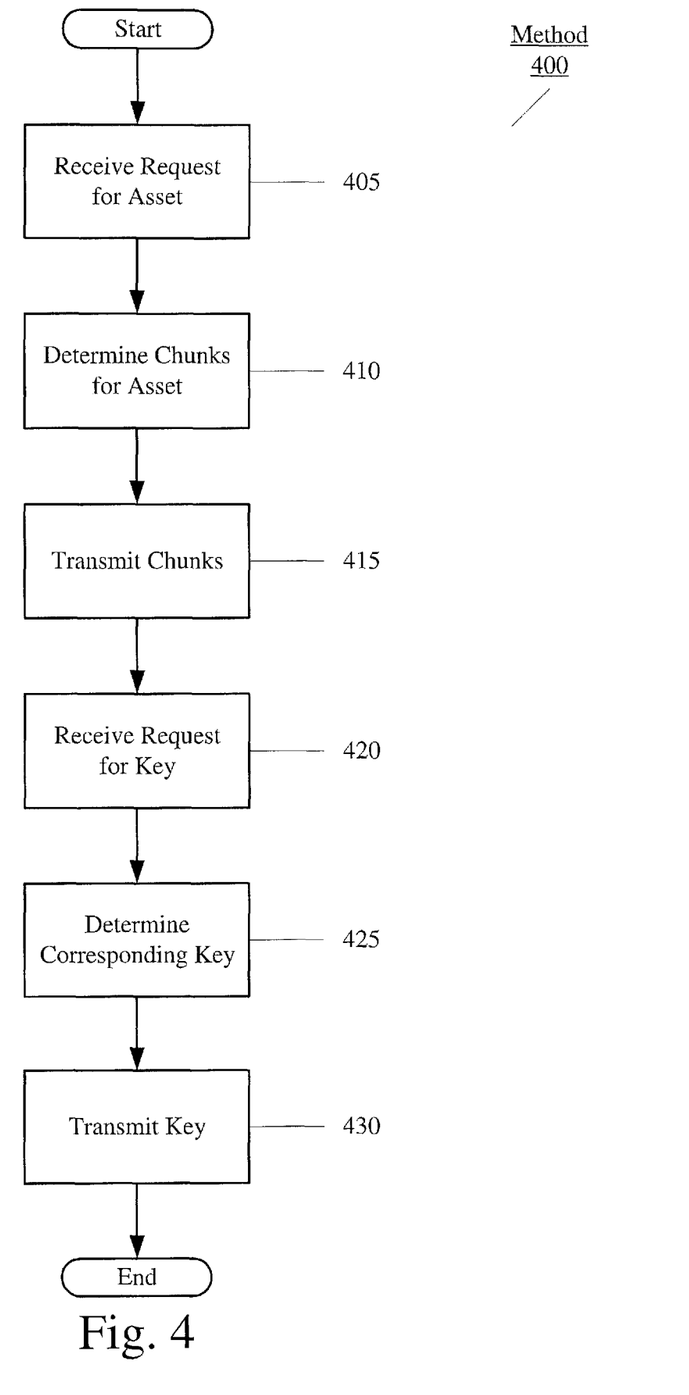
FIG. 4 shows a method for delivering an asset according to the exemplary embodiments.

FIG. 4 shows a method 400 for delivering the asset 100 according to the exemplary embodiments. The method 400 will be described with reference to the asset 100 and the encoded asset 100' of FIG. 1 and the system 200 of FIG. 2. The method 400 will be described below with regard to the chunks 105 and the keys 110 being created prior to the request for the asset 100 being received. The method 400 will also be described below in which the user of the client 205 has already been authorized. The method 400 will further be described below with regard to the server 210.

In step 405, the server 210 receives the request 220 for the asset 100 from the client 205. As discussed above, the user may select the asset 100 from the client-server application which in turn generates the request 220 for transmission to the server 210. In step 410, the server 210 determines the corresponding chunks 105 for the asset 100. Specifically, the chunks 105 correspond to the encoded asset 100' representing the asset 100 that has already been translated. Subsequently, in step 415, the server 210 transmits 225 the chunks 105 to the client 205.

In step 420, the server 210 receives the request 230 for the key 110 from the client 205. As discussed above, the application is only capable of generating the asset 100 from the encoded asset 100' upon receiving all the chunks 105 and the key 110. Thus, the application generates the request 230 for transmission to the server 210. In step 425, the server 210 determines the corresponding key 110 for the asset 100. Specifically, the key 110 corresponds to the encoded asset 100' representing the asset 100. Subsequently, in step 430, the server 210 transmits 235 the key 110 to the client 205.

Accordingly, upon receiving the chunks 105 in step 415 and the key 110 in step 430, the application is able to reassemble the entire combined string of the encoded asset 100'. The application is then able to decode the entire combined string of the encoded asset 100' to generate the asset 100. It should be noted that the decoding of the encoded asset 100' may be performed using any known method such as executing JavaScript commands within a browser application. It should also be noted that the reassembly of the encoded asset 100' from the chunks 105 and the key 110 may also be performed using any known method.

It should be noted that the method 400 may include additional steps. For example, the method 400 may incorporate an authentication step at various points along the method 400. In a first example, the method 400 may include an authentication step upon receiving the request for the asset (step 405). The server 210 may determine whether the request was received from an authorized user. If authorized, the method 400 may continue to the following step. In a second example, the method 400 may include an authentication step or a further authentication step upon receiving the request for the key (step 420).

As discussed above, the manner in which the asset is separated into chunks and keys may be performed at different times. According to a first exemplary embodiment, the method 300 may be performed prior to the delivery of the asset as performed in the method 400. That is, the method 300 is initially performed such that the asset is separated into the chunks and keys and stored. According to a second exemplary embodiment, the method 400 may incorporate the method 300 when the asset is separated dynamically or in an ad hoc manner. Specifically, the method 300 may be performed upon receiving the request for the asset (step 405). Upon performing the method 300 at this time, the method 400 may continue to step 415 as the chunks are already determined (step 410).

The exemplary embodiments provide a system and method for an asset protection scheme. An asset may be translated into an encoded asset that includes a plurality of characters as a string. A server of the system may determine a key for the encoded asset such that a plurality of chunks are created when the key is extracted from the string at each occurrence. When a client requests the asset, the server may initially transmit only the chunks to the client. The client may subsequently request the key such that the server transmits the key to the client. Upon receiving the key and the chunks, an application of the client may reassemble the encoded asset for decoding to access the asset.

Since data is removed from the encoded asset in the form of keys at the time of delivery, the risk of intellectual property loss through interception as the asset is transmitted to the client is reduced. The above described method of generating the chunks and key and the manner in which the asset is eventually transmitted will deter user attempts of bulk-downloading and distributing sensitive assets. The exemplary embodiments allow for an integration with common client/server web applications using common web programming languages, provide a lightweight experience with respect to consumer expectations and common load profiles of web applications, eliminates any expensive licensing agreements associated with complex encryption applications, and protects again asset interception during HTTP delivery.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the delivery operation by the server may be embodied as a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
receiving, by a data chunk serving server, a first request for an asset from a client device;
transmitting, by the data chunk serving server, a plurality of data chunks to the client device, each of the data chunks containing the corresponding content of a portion of the asset;
receiving, by a key serving server, a second request for key data from the client device, the key data containing the corresponding content of data removed during data removal from the asset to create the plurality of data chunks, wherein a combination of the plurality of data chunks and the key data contains a corresponding entirety of the contents of the asset; and
transmitting, by the key serving server, the key data to the client device.

2. The method of claim 1, further comprising:
prior to receiving the first request,
translating, by the data chunk serving server, the asset into encoded asset data;
determining, by the data chunk serving server, the key data from the encoded asset data; and
extracting, by the data chunk serving server, instances of the key data from the encoded asset data to create the plurality of data chunks.

3. The method of claim 2, further comprising:
storing, in a remote database, the plurality of data chunks and the key data.

4. The method of claim 2, further comprising:
determining, by the data chunk serving server, whether a number of the plurality of data chunks is within a predetermined range.

5. The method of claim 2, further comprising:
prior to determining the key data, selecting, by the data chunk serving server, a first key data as a function at least one of a number of characters, a number of the instances of the key data within the encoded asset data, and a number of the plurality of data chunks.

6. The method of claim 5, further comprising:
determining whether the first key data is at least one of (a) one of less than and more than a predetermined range of the number of characters, (b) one of less than and more than a predetermined range of the number of instances, and (c) one of less than and more than the number of the plurality of data chunks; and
selecting, by the data chunk serving server, a second key data if at least one of (a), (b), and (c) is not satisfied.

7. The method of claim 2, wherein the instances of the key data are extracted selectively.

8. The method of claim 1, further comprising:
authenticating, by the data chunk serving server, the client device upon receiving the first request; and
authenticating, by the key serving server, the client device upon receiving the second request.

9. The method of claim 1, wherein the data chunk serving server and the key serving server comprise the same server.

10. The method of claim 1, wherein the key data is a programmatic sequence of keys.

11. A method, comprising:
transmitting, by a client device, a first request for an asset;
receiving, by the client device, a plurality of data chunks, each of the data chunks containing the corresponding content of a portion of the asset;
transmitting, by the client device, a second request for key data, the key data containing the corresponding content of at least one further portion of the asset, wherein a combination of the plurality of data chunks and the key data contains a corresponding entirety of the contents of the asset;
receiving, by the client device, the key data; and
assembling, by the client device, the asset as a function of the key data and the plurality of data chunks.

12. The method of claim 11, further comprising:
creating, by the client device, an encoded asset data by inserting the key data within the plurality of data chunks; and
translating, by the client device, the encoded asset data into the asset.

13. The method of claim 12, further comprising:
prior to transmitting the first request, receiving a selection corresponding to the asset.

14. The method of claim 11, further comprising:
transmitting, by the client device, authentication data to the server.

15. A device, comprising:
a receiver configured to receive a first request for an asset from a client device, the receiver further configured to receive a second request for key data from the client device; and
a transmitter configured to transmit a plurality of data chunks to the client device, each of the data chunks containing the corresponding content of a portion of the asset, the key data containing the corresponding content of data removed during data removal from the asset to create the plurality of data chunks, wherein a combination of the plurality of data chunks and the key data contains a corresponding entirety of the contents of the asset, the transmitter further configured to transmit the key data to the client device.

16. The device of claim 15, further comprising:
a processor configured to translate the asset into encoded asset data, determine the key data from the encoded asset data, and extract instances of the key data from the encoded asset data to generate the plurality of data chunks.

17. The device of claim 16, further comprising:
a memory arrangement configured to store the plurality of data chunks and the key data.

18. The device of claim 16, wherein the processor is configured to determine whether a number of the plurality of data chunks is within a predetermined range.

19. The device of claim 15, wherein the receiver is configured to receive authentication data upon receiving at least one of the first request and the second request.

20. A device, comprising:
a transmitter configured to transmit a first request for an asset, the transmitter further configured to transmit a second request for key data, the key data containing the corresponding content of at least one corresponding portion of the asset;
a receiver configured to receive a plurality of data chunks, each of the data chunks containing the corresponding content of a further portion of the asset, the receiver further configured to receive the key data, wherein a combination of the plurality of data chunks and the key data contains a corresponding entirety of the contents of the asset; and
a processor configured to assemble the asset as a function of the key data and the plurality of data chunks.

21. The device of claim 20, wherein the processor is configured to create an encoded asset data by inserting the key data within the plurality of data chunks and translate the encoded asset data into the asset.

22. The device of claim 20, wherein the processor is configured to receive a selection corresponding to the asset.

23. The device of claim 20, wherein the transmitter is configured to transmit authentication data to the server.

* * * * *